(12) United States Patent
Radon et al.

(10) Patent No.: US 12,037,949 B2
(45) Date of Patent: Jul. 16, 2024

(54) BEARING-SUPPORTED SHAFT ASSEMBLY

(71) Applicant: PRATT & WHITNEY CANADA CORP., Longueuil (CA)

(72) Inventors: Joanna Radon, Rakszawa (PL); Marcin Rejman, Rzeszow (PL)

(73) Assignee: PRATT & WHITNEY CANADA CORP., Longueuil (CA)

( * ) Notice: Subject to any disclaimer, the term of this patent is extended or adjusted under 35 U.S.C. 154(b) by 95 days.

(21) Appl. No.: 17/809,058

(22) Filed: Jun. 27, 2022

(65) Prior Publication Data

US 2023/0417191 A1    Dec. 28, 2023

(51) Int. Cl.
| | |
|---|---|
| *F02C 7/28* | (2006.01) |
| *F02C 7/36* | (2006.01) |
| *F16C 3/02* | (2006.01) |
| *F16C 33/76* | (2006.01) |

(52) U.S. Cl.
CPC .................. *F02C 7/28* (2013.01); *F02C 7/36* (2013.01); *F16C 3/02* (2013.01); *F16C 33/76* (2013.01); *F05D 2240/50* (2013.01); *F05D 2240/55* (2013.01); *F16C 2326/43* (2013.01)

(58) Field of Classification Search
CPC ...... F02C 7/28; F02C 7/36; F16C 3/02; F16C 33/76; F16C 2326/43; F05D 2240/50; F05D 2240/55
USPC .......................................................... 415/43
See application file for complete search history.

(56) References Cited

U.S. PATENT DOCUMENTS

| | | | |
|---|---|---|---|
| 4,693,616 A | 9/1987 | Rohra et al. | |
| 7,063,193 B2* | 6/2006 | Yoshida | F16C 33/76 |
| | | | 192/84.91 |
| 7,549,836 B2 | 6/2009 | Anderson et al. | |
| 8,939,710 B2 | 1/2015 | Webb | |
| 9,121,304 B2 | 9/2015 | Marsal et al. | |
| 9,212,556 B2 | 12/2015 | Lucas et al. | |
| 10,436,065 B2 | 10/2019 | DiBenedetto | |
| 10,947,863 B2 | 3/2021 | Ivakitch et al. | |
| 10,954,817 B2 | 3/2021 | Ivakitch et al. | |

(Continued)

FOREIGN PATENT DOCUMENTS

EP    3527838    8/2019

OTHER PUBLICATIONS

1 European Search Report issued on Oct. 23, 2023 for corresponding application 23181756.0.

*Primary Examiner* — Yi-Kai Wang
(74) *Attorney, Agent, or Firm* — NORTON ROSE FULBRIGHT CANADA LLP

(57) ABSTRACT

A shaft assembly for an aircraft powerplant, comprising: a shaft extending along an axis from a first shaft end to a second shaft end; a bearing assembly extending about the axis and supporting the first shaft end of the shaft, the bearing assembly including an inner race secured to the shaft and an outer race radially outward of the inner race relative to the axis; a seal extending about the axis and located radially outward of the shaft, the seal disposed axially between the bearing assembly and the second shaft end; a housing having a housing wall located between the bearing assembly and the seal; and a washer extending about the axis and located axially between the bearing assembly and the seal, the washer extending axially from the outer race to the housing wall.

20 Claims, 6 Drawing Sheets

(56) References Cited

U.S. PATENT DOCUMENTS

2002/0079179 A1\* 6/2002 Hirota ................... F16D 27/115
              192/115
2019/0257294 A1  8/2019 Abreu \* cited by examiner

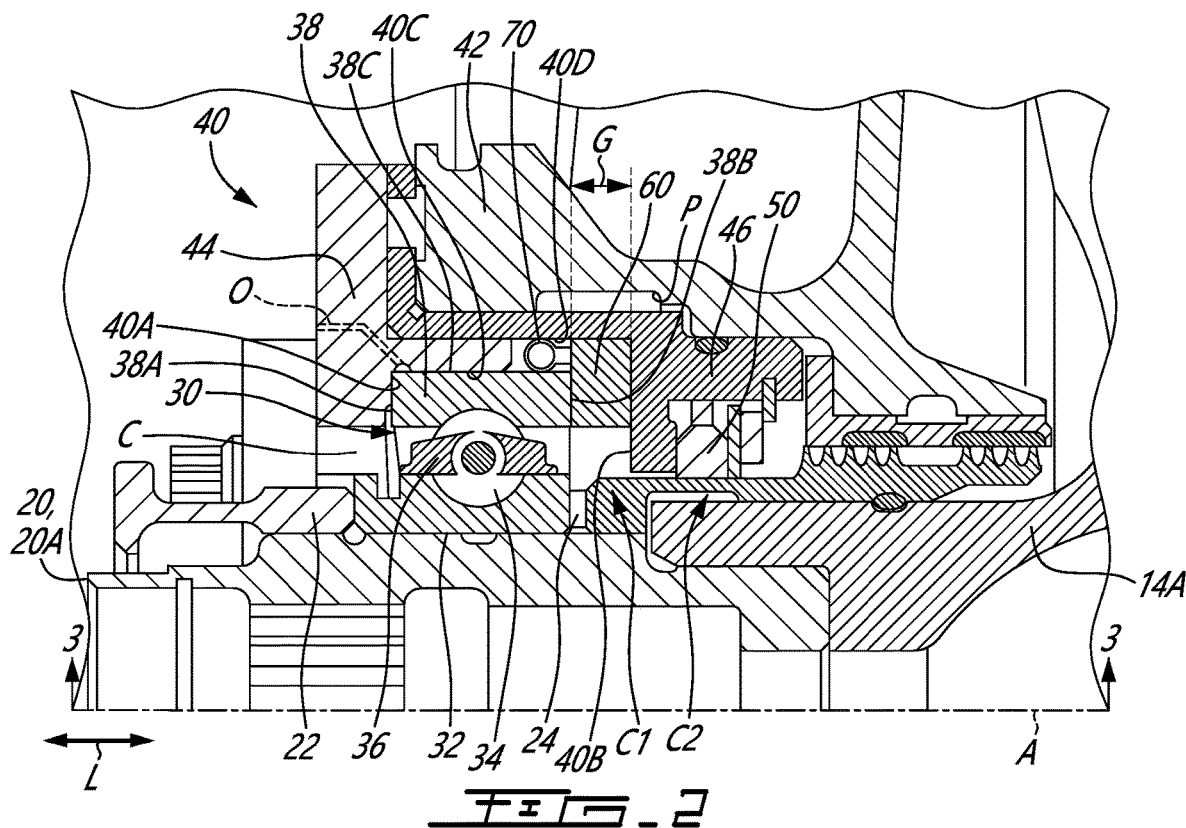
FIG_2
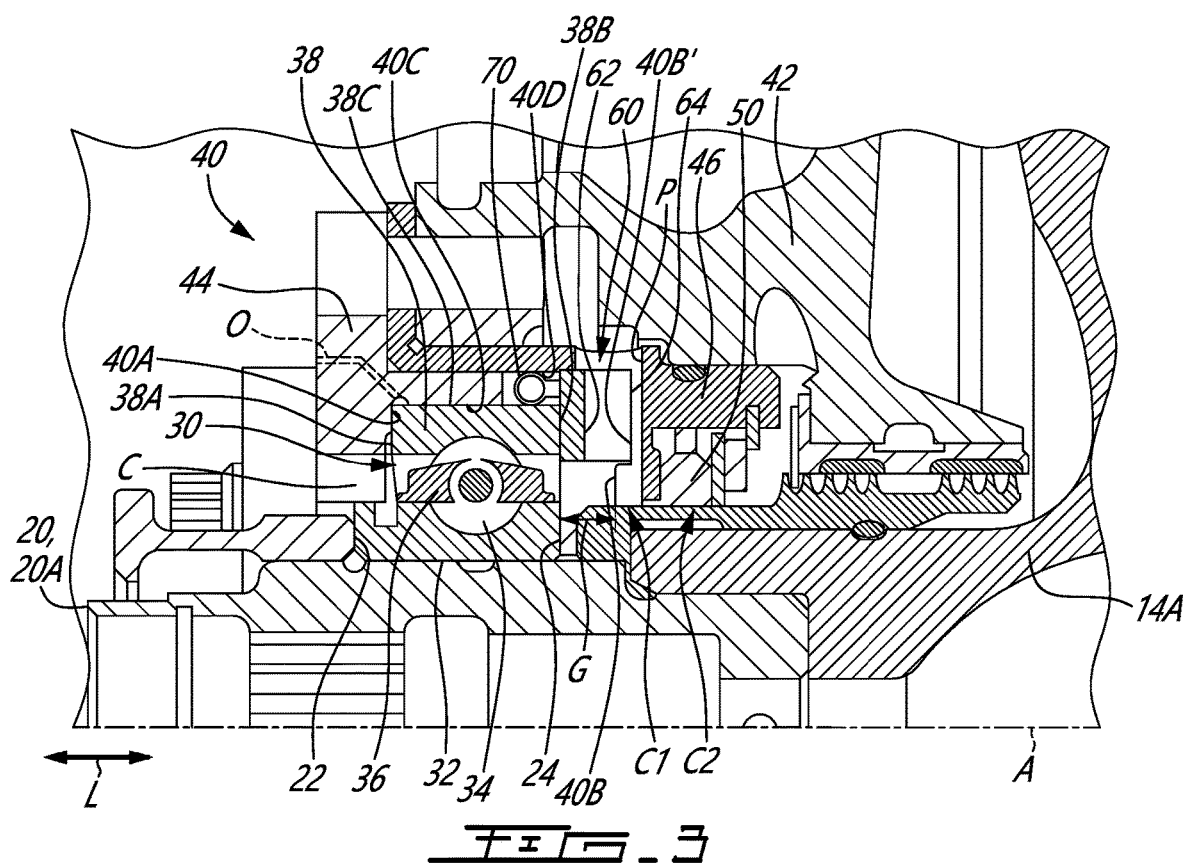
FIG_3

BEARING-SUPPORTED SHAFT ASSEMBLY

TECHNICAL FIELD

The disclosure relates generally to shaft assemblies for aircraft engines and, more particularly, to bearing-supported shaft assemblies for aircraft engines.

BACKGROUND

Certain aircraft engines include a main rotor shaft drivingly engaged to a compressor and supported by a number of bearing assemblies that are disposed at different axial locations along the shaft. As the engine operates, the shaft and at least some of the bearing assemblies become loaded axially due to operating loads developed by the compressor. As such operating loads may vary in magnitude and axial direction, considerations must be taken into account to ensure that the shaft remains suitably supported across a range of power outputs.

SUMMARY

In accordance with an aspect of the present disclosure, there is provided a shaft assembly for an aircraft powerplant, comprising: a shaft extending along an axis from a first shaft end to a second shaft end; a bearing assembly extending about the axis and supporting the first shaft end of the shaft, the bearing assembly including an inner race secured to the shaft and an outer race radially outward of the inner race relative to the axis; a seal extending about the axis and located radially outward of the shaft, the seal disposed axially between the bearing assembly and the second shaft end; a housing having a housing wall located between the bearing assembly and the seal; and a washer extending about the axis and located axially between the bearing assembly and the seal, the washer extending axially from the outer race to the housing wall.

In accordance with another aspect, there is provided an aircraft powerplant comprising: a shaft extending along an axis of the powerplant from a first shaft end to a second shaft end; a gearbox operatively connected to the first shaft end; a compressor rotor secured to the shaft at an axial location between the first shaft end and the second shaft end; a bearing assembly supporting the first shaft end, the bearing assembly including an inner race secured to the shaft and axially bound between the first shaft end and the compressor rotor, and an outer race radially outward of the inner race; a seal located radially outward of the shaft, the seal located axially between the bearing assembly and the second shaft end; a housing having a housing wall located between the bearing assembly and the seal, and an annular housing surface facing radially inwardly and surrounding the outer race; an annular bearing seal extending radially from the outer race to the annular housing surface; and a washer about the axis located axially between the bearing assembly and the seal relative to the axis, the washer extending axially from the outer race to the housing wall and radially from inward of the annular bearing seal to the annular housing surface.

BRIEF DESCRIPTION OF THE DRAWINGS

Reference is now made to the accompanying figures in which:

FIG. 2 is a cross-sectional view of the APU of FIG. 1 taken along the line 2-2 of FIG. 1;

FIG. 3 is a cross-sectional view of the APU of FIG. 1 taken along the line 3-3 of FIG. 2;

DETAILED DESCRIPTION

Figure 1:
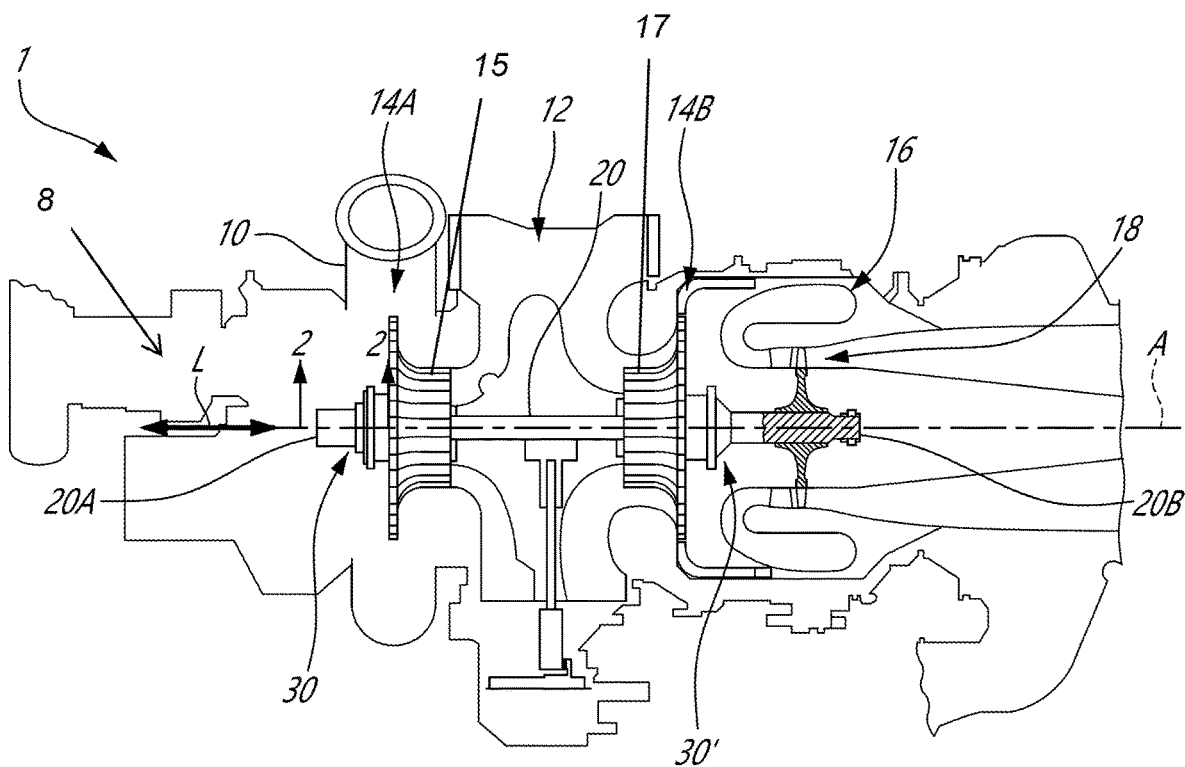
FIG. 1 is a schematic cross-sectional view of an auxiliary power unit (APU)

FIG. 1 illustrates a powerplant 1 that may be used in an aircraft. In addition to airborne applications, the powerplant 1 may also be used in marine or industrial applications depending on the embodiment. The forthcoming description pertains to an exemplary powerplant 1 of a type commonly referred to as an auxiliary power unit (hereinafter APU 1). The APU 1 comprises a casing 10, an inlet 12 connected to the casing 10 through which ambient air is drawn, a load (or first) compressor 14A (which includes a first compressor rotor 15) to compress some of the drawn air upstream of aircraft pneumatic system(s), a power (or second) compressor 14B (which includes a second compressor rotor 17) to compress some of the drawn air upstream of a combustor 16 in which the compressed air is mixed with fuel and ignited for generating an annular stream of hot combustion gases, and a turbine 18 for extracting energy from the combustion gases. A shaft 20 extends along an axis A of the APU 1 from a first shaft end 20A, which may be connected to an aircraft load (e.g., a gearbox 8 or an electric AC generator), to a second shaft end 20B connected to the turbine 18. The shaft 20 is rotationally driven about the axis A by the turbine 18 and rotates with the compressors 14A, 14B. A first and a second bearing assembly 30, 30' disposed proximate to the first 14A and the second 14B compressors respectively support the shaft 20 about the axis A relative to the casing 10.

During operation of the APU 1, the first bearing assembly 30 (hereinafter the bearing 30) is subjected to an internal load oriented axially relative to the axis A and originating from the compressor(s) 14A, 14B and/or the turbine 18, as schematically shown by arrow L. The internal load L corresponds to a compound of all axial loads imposed by the compressors 14A, 14B and the turbine 18 as borne by the bearing system 30. As the APU 1 operates, the internal load L may vary in magnitude and/or direction. For instance, the internal load L is generally directed toward the first shaft end 20A (i.e., forward) when the APU 1 operates under normal conditions. Under certain circumstances however, the internal load L may be directed toward the second shaft end 20B (i.e., aft), for example upon the compressor(s) 14A, 14B undergoing a surge. As will become apparent from the forthcoming, the APU 1 is provided with features that palliate undesirable effects that such variations of the internal load L may otherwise have on spatial relationship and lubrication of components of the bearing 30.

Exemplary embodiments of a shaft assembly of the APU 1 will now be described. Referring particularly to FIGS. 2 and 3, the shaft assembly generally comprises the shaft 20, the bearing 30, a housing 40 secured to the casing 10 and defining a cavity C about the axis A, the bearing 30 being located inside the cavity C, a seal 50 about the axis A inside the cavity C, and a washer 60 about the axis A between the bearing 30 and the seal 50.

The bearing 30 includes an inner race 32 extending circumferentially about the axis A and mounted to the shaft 20, a series of rolling elements 34 disposed circumferentially about the axis A around the inner race 32, an annular cage 36 shaped for maintaining each rolling element of the series of rolling elements 34 in a suitable spatial relationship relative to one another, and an outer race 38 extending circumferentially about the axis A and around the series of rolling elements 34. The bearing 30 is an axial bearing, i.e., a bearing that can withstand axial loads and transfer such loads internally to and from its components. For instance, imparting an axial load to the inner rate 32 can axially load the rolling elements 34, the annular cage 36 and the outer race 38, and vice versa. Several types of suitable axial bearings exist, such as ball bearings (as depicted), tapered roller bearings or the like. It should be noted that the inner race 32 is axially bound, or held in place, relative to the shaft 20 between two axial abutments 22, 24 of the shaft 20 axially spaced from one another relative to the axis A. In this case, the inner race 32 is bound by a nut 22 and a spacer 24 on either side thereof. Hence, the shaft 20 may transmit the internal load L to the inner race 32 either forward via the spacer 24 or aft via the nut 22. The outer race 38 however is axially free relative to the shaft 20, and some axial movement of the inner race 32 relative to the outer race 38 may occur as the shaft 20 transmits the internal load L to the bearing 30 in either direction.

The housing 40 has first and second axial surfaces 40A, 40B defining axial boundaries of the cavity C and respectively facing toward first and second axial surfaces 38A, 38B of the outer race 38. The second axial surface 40B of the housing 40 may be referred to as a side of a housing wall extending radially relative to the axis A inside the cavity C between the bearing 30 and the seal 50 facing toward the bearing 30.

Still referring to FIGS. 2 and 3, the housing 40 also has a first radially inner surface 40C (i.e., a first annular surface of the housing 40 facing radially inwardly relative to the axis A) circumscribing the cavity C and surrounding a portion of a radially outer surface 38C of the outer race 38 that is located proximate to the first axial surface 38A. In the depicted embodiment, the first radially inner surface 40C extends axially relative to the first axial surface 38A along a majority (i.e., more than half) of an axial length of the radially outer surface 38C. The radially outer surface 38C and the first radially inner surface 40C are sized relative to one another so as to define a first annular gap therebetween provided that the outer race 38 is held about the axis A. The housing 40 has an oil supply path shown schematically at O in FIG. 2 that is fluidly connected to the cavity C proximate to a junction between the first axial surface 40A and the first radially inner surface 40C. The oil supply path O pressurizes oil into the cavity C so as to provide a film of oil between the radially outer surface 38C and the first radially inner surface 40C that maintains the first annular gap therebetween, holding the outer race 38 about the axis A.

Proximate to the second axial surface 38B of the outer race 38, the housing 40 has a second radially inner surface 40D (i.e., a second annular surface of the housing 40 facing radially inwardly relative to the axis A) circumscribing the cavity C at a location spaced radially outward from a remainder of the radially outer surface 38C. The radially outer surface 38C of the outer race 38 and the second radially inner surface 40D may be said to respectively define radially inner and radially outer boundaries of a second annular gap surrounding an end of the outer race 38 having the second axial surface 38B. An annular seal 70 is provided in the second annular gap to sealingly engage the second radially inner surface 40D and the radially outer surface 38C, thereby assisting the building of oil pressure in the first annular gap and hindering leakage of oil axially away from the outer race 38 past the second axial end 38B. The annular seal 70 is in this case a C-seal, although other static or dynamic types of seals are contemplated, such as toric seals, o-rings, Garlock seals, lip seals, metal C-seals, spring energized rubber seals, dual cone seals and piston seals, among other examples.

The housing 40 in this case is a multi-structure component including a body 42 secured to the casing 10, and a bearing support 44 and a seal support 46 respectively secured to the casing 10 via the body 42. Depending on the embodiment, the body 42 may be an integral part of the casing 10, or may be separate. The bearing support 44 and the seal support 46 together define the cavity C. The bearing support 44 includes a flange portion defining the first axial surface 40A of the housing 40 next to the outer race 38, and a sleeve portion projecting from the flange portion and extending radially between the outer race 38 and the second radially inner surface 40D of the housing 40. The flange portion in this case defines the oil supply path O. The seal support 46 defines the housing wall having the second axial surface 40B, which may be referred to as a first wall surface. The housing wall may be said to partition the cavity C in a first cavity portion C1 and a second cavity portion C2 inside which are respectively disposed the bearing 30 and the seal 50. A second wall surface of the housing wall opposite to the first wall surface, thus facing away from the washer 60, is located adjacent to the seal 50. It is contemplated that in some embodiments, the housing 40 may comprise fewer components, e.g., the body 42 and one or more of the bearing support 44 and the seal support 46 may be together form a unitary component. In this case, the bearing support 44 defines the first and second axial surfaces 40A, 40B as well as the first radially inner surface 40C, whereas the seal support 46 defines the second radially inner surface 40D. Inside the first cavity portion C1, the outer race 38 and the housing wall are axially spaced from one another so as to define an axial gap G. The axial gap G extends axially from the second axial surface 38B of the outer race 38B to the second axial surface 40B of the housing 40. The housing 40 may define a venting passage P that is fluidly connected to the cavity C, namely to the first cavity portion C1 in the axial gap G, via which heat emanating from the bearing 30 may be evacuated away therefrom. The washer 60 is disposed inside the axial gap G.

Figure 4:
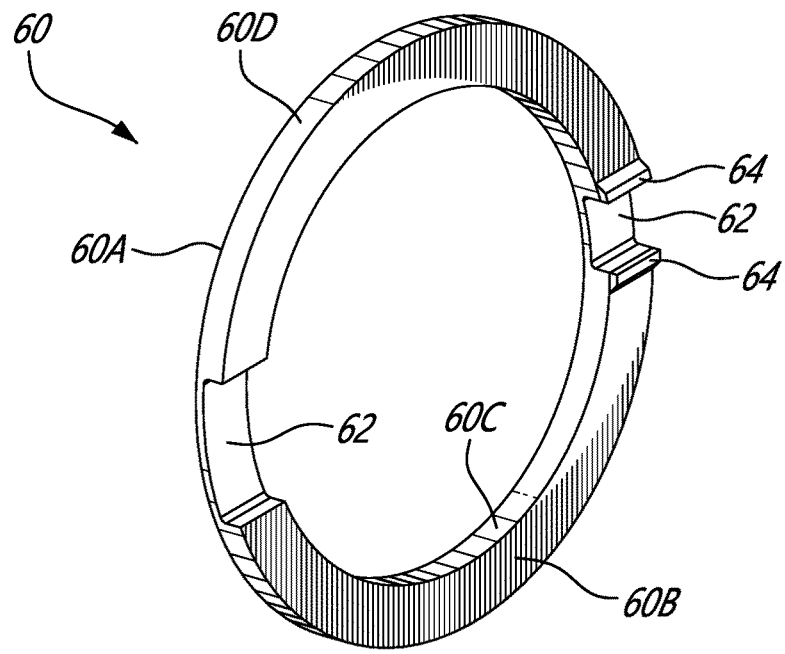
FIG. 4 is a perspective view of a washer of a shaft assembly of the APU of FIG. 1 according to embodiments.
Figure 5:
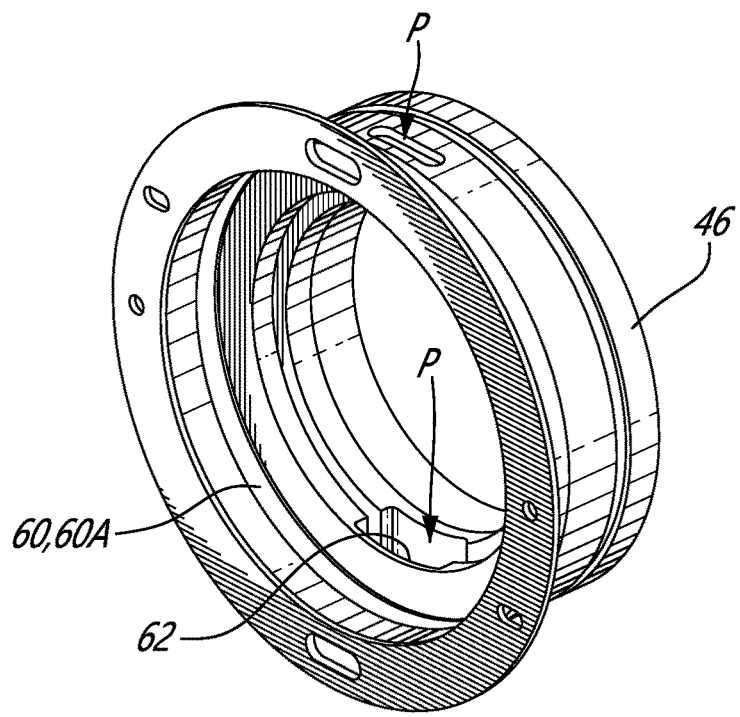
FIG. 5 is a perspective view of the washer of FIG. 4 shown assembled with a housing of the shaft assembly.

Referring to FIGS. 4 and 5, the washer 60 will now be described in further detail. The washer 60 has a first axial surface 60A and a second axial surface 60B facing away from one another. The first and second axial surfaces 60A, 60B are both generally annular in shape and are spaced from one another so as to define an axial width, or thickness, of the washer 60. The washer 60 is sized such that the axial width substantially spans a maximum axial dimension of the axial gap G, i.e., an axial dimension of the gap G resulting from the first axial surface 38A of the outer race 38 being held against the first axial surface 40A of the housing 40, for example when the internal load L is exerted forward onto the first axial surface 40A via the shaft 20 and ultimately by the outer race 38. A nominal (i.e., uncompressed) axial width and/or a rigidity of the washer 60 may be selected for the washer 60 to substantially span the maximum dimension of the axial gap G when the internal load L of a given magnitude (for example corresponding to a known surge condition of the APU 1 as discussed hereinabove) is exerted aft onto the washer 60 via the shaft 20 and ultimately by the outer race 38. In some embodiments, the nominal axial width of the washer 60 is greater than the maximum axial dimension of the axial gap G. In such embodiments, the outer race 38 may be said to be pre-loaded by the washer 60, i.e., being biased toward the first axial surface 40A of the housing 40 regardless of the magnitude and direction of the internal load L. Conveniently, a plurality of washers 60 having different nominal axial widths and/or rigidities may be provided, each suitable to provide a pre-load of a given magnitude for opposing a corresponding magnitude of the internal load L being exerted aft. It will be appreciated that by opposing such aft internal loads L via the washer 60, leakage of oil from the oil supply path O to between the first axial surface 40A of the housing 40 and the first axial surface 38A of the outer race 38, which may be detrimental to the pressurization of the first annular gap, may be mitigated.

Radially, the washer 60 extends from a radially inner surface 60C to a radially outer surface 60D, from radially inward of the radially outer surface 38C to radially outward thereof adjacent to the second annular gap. By virtue of this arrangement, the washer 60 defines an axial abutment that hinders axial displacement of the outer race 38 and of the annular seal 70 toward the second axial surface 40B of the housing 40. In the depicted embodiments, the washer 60 is sized such that upon being located about the axis A inside the axial gap G, the radially inner surface 60C is radially inward of the outer race 38, and the radially outer surface 60D is adjacent to the second radially inner surface 40D of the housing 40, although other arrangements are possible.

In embodiments, the washer 60 may be provided with at least one channel 62 in fluid communication between inside the washer 60 (i.e., radially inward of the radially inner surface 60C) and outside the washer 60 (i.e., radially outward of the radially outer surface 60D). The at least one channel 62 is routed through the washer 60 so as to be in register with the venting passage P upon the washer 60 being disposed inside the axial gap G. As such, heat generated by the bearing 30, for example due to friction occurring at interfaces between the rolling elements 34 and the inner and/or outer races 32, 38 may be evacuated away from the bearing 30 via the at least one channel 62 and away from the cavity C via the venting passage P. The housing 40 may define more than one venting passage P, for example a pair of diametrically-opposed passages P as shown in FIG. 6. Conversely, the at least one channel 62 may in some embodiments include two diametrically-opposed channels 62 (best seen in FIG. 5) defined inward of the second axial surface 60B that may respectively and simultaneously be positioned in register with a corresponding one of the venting passages P.

In embodiments, the washer 60 is provided with at least one anti-rotational shape 64 defined adjacent to the second axial surface 60B that is complementary to an anti-rotational shape 40B' of the housing 40 defined in the second axial surface 40B. By way of this anti-rotational arrangement, wear of the washer 60 that may otherwise occur due to fretting thereof against the housing 40 and/or the outer race 38 may be mitigated. For example, in an exemplary embodiment shown in FIG. 5, the at least one anti-rotational shape 64 may be a pair of protrusions projecting from the second axial surface 60B on either side of one of the channels 62. Optionally, anti-rotational shapes 40B', 64 may be defined by the second axial surface 38B of the outer race 38 (for example one or more slot(s)) and by the first axial surface 60A (for example one or more protrusion(s)) of the washer 60.

Figure 6A:
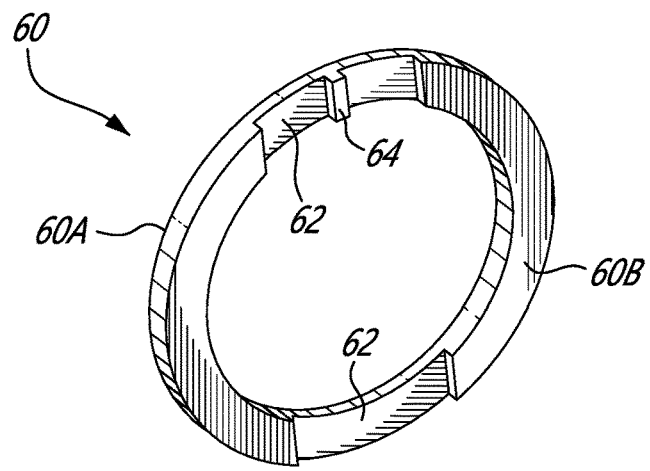
FIGS. 6A-6C are perspective views of a washer of the shaft assembly of the APU of FIG. 1 according to other embodiments.
Figure 6B:
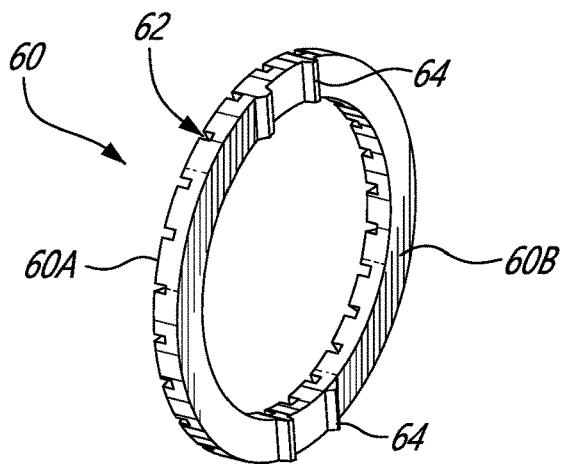
Figure 6C:
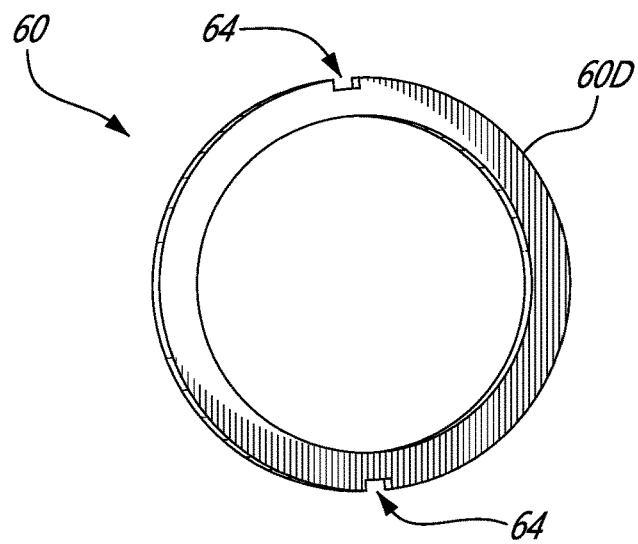

With reference to FIGS. 6A-6C, other non-limiting embodiments of the washer 60 are shown, each having a different implementation of the at least one anti-rotational shape 64. In FIG. 6A, a sole protrusion 64 is provided, in this case projecting from inside a channel 62. In FIG. 6B, two pairs of parallel protrusions 64 are provided on the second axial surface 60B for engagement with the housing 40, whereas the channels 62 are provided on the first axial surface 60A. In FIG. 6C, the at least one anti-rotational shape 64 is provided in the form of two diametrically-opposite notches defined inward of the radially outer surface 60D. Depending on the embodiment, different arrangements of protrusions and/or notches may be provided, on the first axial surface 60A, the second axial surface 60B or the radially outer surface 60D.

Figure 7A:
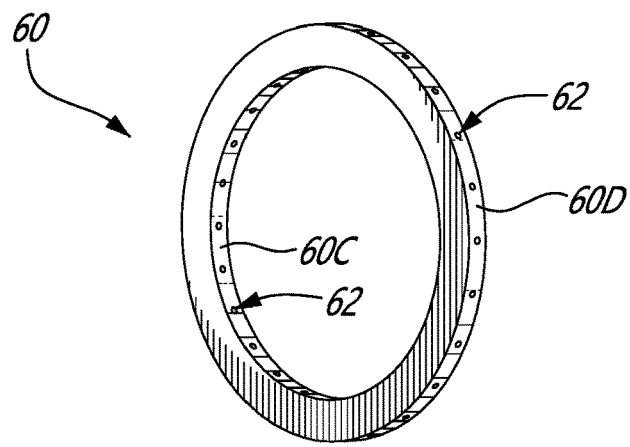
FIGS. 7A-7C are perspective views of a washer of the shaft assembly of the APU of FIG. 1 according to other embodiments.
Figure 7B:
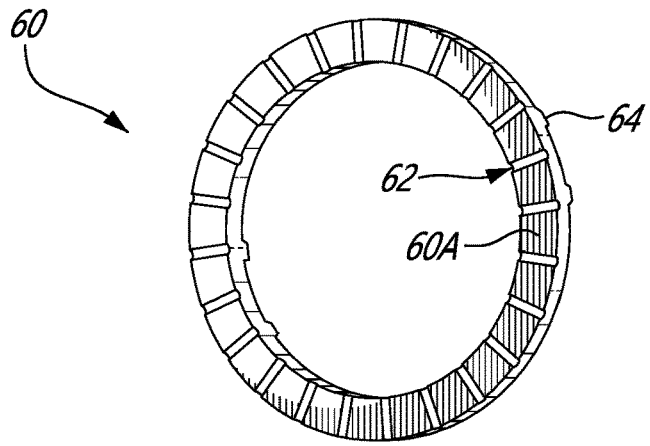
Figure 7C:
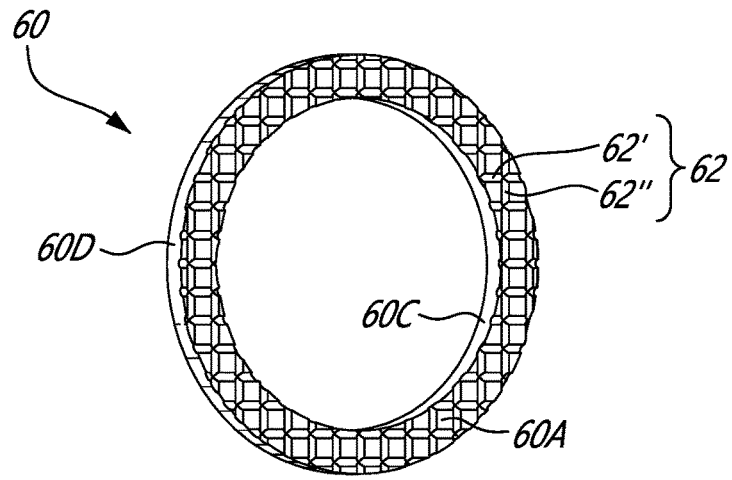

With reference to FIGS. 7A-7B, yet other non-limiting embodiments of the washer 60 are shown, each having a different implementation of the at least one channel 62. In FIG. 7A, the at least one channel 62 is provided in the form of a plurality of radial holes spaced circumferentially from one another and extending from the radially inner surface 60C to the radially outer surface 60D. In FIG. 7B, the at least one channel 62 is provided in the form of a plurality of radial slots spaced circumferentially from one another and extending from the radially inner surface 60C to the radially outer surface 60D, in this case inward of the first axial surface 60A. In FIG. 7C, the at least one channel 62 includes a network of at least one first channel 62' and at least one second channel 62" extending inward of the first axial surface 60A for example, the first and second channels 62', 62" extending in this case linearly and at an angle relative to one another. Depending on the embodiment, different arrangements of channels 62 may be provided, so long as they provide fluid communication from inside the washer 60 to outside thereof.

Figure 8A:
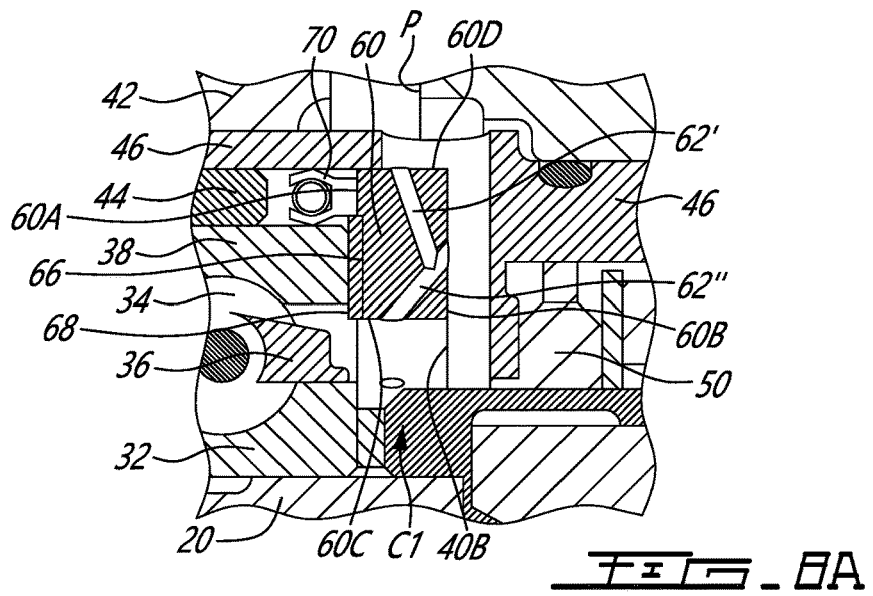
FIGS. 8A-8C are cross-sectional views of a washer of the shaft assembly of the APU of FIG. 1 according to other embodiments.
Figure 8B:
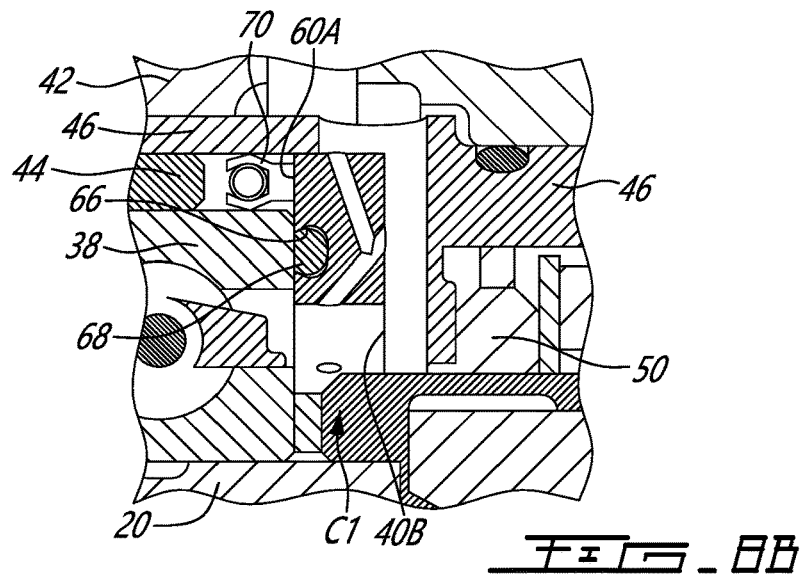
Figure 8C:
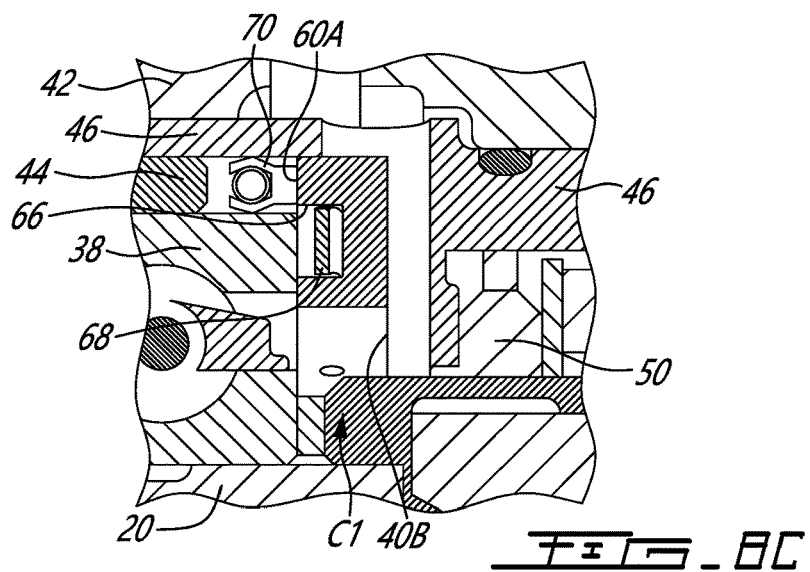

With reference to FIGS. 8A-8C, in some embodiments, the washer 60 has an annular recess 66 defined inward of its first axial surface 60A, and the shaft assembly of the APU 1 further comprises a resilient element 68 received inside the annular recess 66. The washer 60 and the resilient element 68 may be structured and arranged relative to one another to achieve a desired pre-load magnitude onto the outer race 38. In the embodiment depicted in FIG. 8A, the resilient element 68 is a flat gasket that may be less rigid than the washer 60. The annular recess 66 and the resilient element 68 extend radially outwardly from radially inward of the outer race 38 to radially outward thereof, such that the resilient element 68 spans a radial height of the outer race 38 while being suitably supported by the washer 60. In embodiments, the resilient element 68 only covers a portion of the radial height outer race 38. Also of note with regard to FIG. 8A, the at least one channel 62 includes a network of first and second channels 62', 62" in the form of holes in fluid communication with one another and extending with respect to the axis A in orientations other than radial. In FIG. 8B, the resilient element 68 is provided in the form of a toric joint which may be less rigid than the washer 60, and the annular recess 66 is shaped so as to be axially retentive of the resilient element 68. In this example, the resilient element 68 and the annular recess 66 are sized relative to one another such that a radial height of the annular recess 66 is smaller than a radial height (or diameter of a cross-section) of the resilient element 68, whereas an axial depth of the annular recess 66 is greater than half of the radial height (or diameter of the cross-section) of the resilient element 68. In FIG. 8C, the resilient element 68 is provided in the form of a wave spring. Other types of springs are contemplated, for example helicoidal springs. It is contemplated that in some embodiments, an annular member (or second washer, not shown) may be provided in the axial gap G between the outer race 38 and the first axial surface 60A over the annular recess 66 such that the resilient element 68 is axially bound between the washer 60 and the annular member in a compressed state. In such cases, the axial dimension of the washer 60, the resilient element 68 and the annular member being axially stacked as described hereinabove are sized to amount to the maximum axial dimension of the axial gap G.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the present technology could be implemented on powerplants of a type other than an APU, and/or on powerplants provided for applications other than airborne. Yet further modifications could be implemented by a person of ordinary skill in the art in view of the present disclosure, which modifications would be within the scope of the present technology.

The invention claimed is:

1. A shaft assembly for an aircraft powerplant, comprising:
   a shaft extending along an axis from a first shaft end to a second shaft end;
   a bearing assembly extending about the axis and supporting the first shaft end of the shaft, the bearing assembly including an inner race secured to the shaft and an outer race radially outward of the inner race relative to the axis;
   a seal extending about the axis and located radially outward of the shaft, the seal disposed axially between the bearing assembly and the second shaft end;
   a housing having a housing wall located between the bearing assembly and the seal; and
   a washer extending about the axis and located axially between the bearing assembly and the seal, the washer extending axially from the outer race to the housing wall;
   wherein the washer and the housing wall respectively have complementary anti-rotational shapes.

2. The shaft assembly of claim 1, further comprising an annular bearing seal about the axis extending radially from the outer race to an annular housing surface of the housing facing radially inwardly relative to the axis, the washer extending radially from inward of the annular bearing seal to the annular housing surface.

3. The shaft assembly of claim 1, wherein the housing includes a seal support having the housing wall, the housing wall having a first wall surface adjacent to the washer and a second wall surface facing away from the washer and located adjacent to the seal.

4. A shaft assembly for an aircraft powerplant, comprising:
   a shaft extending along an axis from a first shaft end to a second shaft end;
   a bearing assembly extending about the axis and supporting the first shaft end of the shaft, the bearing assembly including an inner race secured to the shaft and an outer race radially outward of the inner race relative to the axis;
   a seal extending about the axis and located radially outward of the shaft, the seal disposed axially between the bearing assembly and the second shaft end;
   a housing having a housing wall located between the bearing assembly and the seal; and
   a washer extending about the axis and located axially between the bearing assembly and the seal, the washer extending axially from the outer race to the housing wall;
   wherein the washer has a radially inner washer surface, a radially outer washer surface, and at least one washer channel in fluid communication between the radially inner washer surface and the radially outer washer surface.

5. The shaft assembly of claim 4, wherein the housing defines a venting channel in register with the washer channel.

6. The shaft assembly of claim 4, wherein the washer and the housing wall respectively have complementary anti-rotational shapes.

7. The shaft assembly of claim 1, further comprising a resilient element received in an annular recess defined in a first surface of the washer facing toward the bearing assembly.

8. The shaft assembly of claim 7, wherein the annular recess is axially retentive and the resilient element is a toric joint.

9. The shaft assembly of claim 7, wherein the annular recess and the resilient element extends radially inwardly from outward of the outer race to inward of the outer race, and the resilient element is a flat gasket.

10. The shaft assembly of claim 7, wherein the resilient element is one of a wave spring and a helicoidal spring.

11. An aircraft powerplant comprising:
    a shaft extending along an axis of the powerplant from a first shaft end to a second shaft end;
    a gearbox operatively connected to the first shaft end;
    a compressor rotor secured to the shaft at an axial location between the first shaft end and the second shaft end;
    a bearing assembly supporting the first shaft end, the bearing assembly including an inner race secured to the shaft and axially bound between the first shaft end and the compressor rotor, and an outer race radially outward of the inner race;
    a seal located radially outward of the shaft, the seal located axially between the bearing assembly and the second shaft end;
    a housing having a housing wall located between the bearing assembly and the seal, and an annular housing surface facing radially inwardly and surrounding the outer race an annular bearing seal extending radially from the outer race to the annular housing surface; and
    a washer about the axis located axially between the bearing assembly and the seal relative to the axis, the washer extending axially from the outer race to the housing wall and radially from inward of the annular bearing seal to the annular housing surface.

12. The aircraft powerplant of claim 11, wherein the housing includes a bearing support having a flange portion located next to the outer race and a sleeve portion projecting axially from the flange portion and extending radially between the outer race and the annular housing surface, the flange portion defining an oil supply path in fluid communication with an annular gap defined radially between the sleeve portion and the outer race.

13. The aircraft powerplant of claim 12, wherein the washer is axially compressed between the housing wall and the outer race to axially hold the outer race against the flange portion.

14. The aircraft powerplant of claim 12, wherein the housing includes a seal support having the housing wall, the housing wall having a first wall surface adjacent to the washer and a second wall surface facing away from the washer and located adjacent to the seal.

15. The aircraft powerplant of claim 14, wherein the housing defines a cavity receiving the seal support and the bearing support, the housing defining at least one venting channel in fluid communication with the cavity between the seal support and the bearing support.

16. The aircraft powerplant of claim 15, wherein the washer has a radially inner washer surface, a radially outer washer surface, and at least one washer channel in fluid communication between the radially inner washer surface and the radially outer washer surface, the at least one washer channel in register with the at least one venting channel.

17. The aircraft powerplant of claim 11, wherein the washer and the housing wall respectively have complementary anti-rotational shapes.

18. The aircraft powerplant of claim 11, further comprising a resilient element received in an annular recess defined in a first surface of the washer facing toward the bearing assembly.

19. The aircraft powerplant of claim 18, wherein the annular recess is axially retentive and the resilient element is a toric joint.

20. The aircraft powerplant of claim 18, wherein the resilient element is one of a flat gasket, a wave spring and a helicoidal spring.

\* \* \* \* \*